(12) United States Patent
Dabbiere et al.

(10) Patent No.: US 9,756,141 B2
(45) Date of Patent: Sep. 5, 2017

(54) MEDIA CONTENT CONSUMPTION ANALYTICS

(71) Applicant: AirWatch LLC, Atlanta, GA (US)

(72) Inventors: Alan Dabbiere, McLean, VA (US); Erich Peter Stuntebeck, Marietta, GA (US)

(73) Assignee: AirWatch LLC, Atlanta, GA (US)

( * ) Notice: Subject to any disclaimer, the term of this patent is extended or adjusted under 35 U.S.C. 154(b) by 162 days.

(21) Appl. No.: 14/730,357

(22) Filed: Jun. 4, 2015

(65) Prior Publication Data

US 2016/0359990 A1    Dec. 8, 2016

(51) Int. Cl.
*G06F 15/16* (2006.01)
*H04L 29/08* (2006.01)
*H04L 29/06* (2006.01)

(52) U.S. Cl.
CPC ............ *H04L 67/22* (2013.01); *H04L 63/083* (2013.01); *H04L 63/0861* (2013.01); *H04L 63/10* (2013.01); *H04L 65/1083* (2013.01); *H04L 65/60* (2013.01); *G06F 2221/2103* (2013.01); *G06F 2221/2133* (2013.01)

(58) Field of Classification Search
CPC ..................................................... H04L 67/22
USPC ............................................................ 709/219
See application file for complete search history.

(56) References Cited

U.S. PATENT DOCUMENTS

2006/0184697 A1* 8/2006 Virdi ................ H04L 47/26
                                                              709/248
2014/0289241 A1* 9/2014 Anderson ......... G06F 17/30038
                                                              707/736

* cited by examiner

*Primary Examiner* — Adnan Mirza

(57) ABSTRACT

Disclosed are various examples for analyzing the consumption of media content on a client device. A computing environment can be employed to access measurement data obtained by a client application executable on the client device during a rendering of media content on the client device. The computing environment generates a metric describing a probability a user of the client device has watched or otherwise consumed at least a portion of the media content being rendered on the client device. A determination can be made whether a compliance rule associated with the media content has been satisfied using the generated metric. If the compliance rule associated with the media content is not satisfied, a suitable remedial action can be determined and performed in the client device.

20 Claims, 9 Drawing Sheets

MEDIA CONTENT CONSUMPTION ANALYTICS

BACKGROUND

Employees are often required to watch training videos or listen to audio instructions on a mobile device, and students are often required to watch or listen to video lessons. For example, in a bring-your-own-device (BYOD) environment, an enterprise may require an employee to watch a video prior to the employee being able to utilize his or her device, such as a smartphone, tablet, or laptop, in order to access enterprise data, including e-mail, documents, applications, or other similar files.

However, employees and other personnel are able to manipulate media player applications into believing the user has consumed a media file in its entirety. For example, employees are able to fast forward to the end of the video to trick a particular media player application into believing the user has watched the video in its entirety. Similarly, an employee can allow a video to play while the employee walks away from or otherwise ignores the video.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to analyzing the consumption of media content on a client device. As discussed above, employees are often required to watch training videos on a mobile device, and students are often required to watch video lessons. For example, in a bring-your-own-device (BYOD) environment, an enterprise may require an employee to watch a video prior to the employee being able to utilize his or her device, such as a smartphone, tablet, or laptop, in order to access enterprise data, including e-mail, documents, applications, or other similar files.

However, employees are able to manipulate media player applications, or other similar applications, into believing the user has consumed a media file in its entirety. For example, employees are able to fast forward to the end of the video to trick a particular media player application into mistakenly detecting that the user has watched the video in its entirety. Similarly, an employee can allow a video to play while the employee walks away from or otherwise ignores the video. Determining whether a user has paid attention to all or a portion of a media file remains problematic.

In an example scenario, a computing environment can remotely obtain measurements associated with a user's interaction (or lack of interaction) with the client device. The measurements obtained from the client device can be used to generate a metric describing a probability of whether the user has consumed a media file. The metric generated for the user can be used to determine whether a compliance rule associated with the media content has been satisfied. For example, the metric can indicate that there is a 98% probability that the user consumed all of a particular media file. If a compliance rule for the particular media file requires a 99% probability, a determination is made that the compliance rule is not satisfied based on the generated metric. However, if the compliance rule for the particular media file requires a 97% probability, a determination is made that the compliance rule is satisfied.

If the compliance rule associated with the particular media file is not satisfied, a remedial action can be determined. The remedial action can include, for example, pausing a playback of the media content, rewinding the media content to a point in time where a determination was made that the user was most recently consuming the media content, disabling a function of the client device, or generating a user interface component that requires input from the user.

Figure 1:
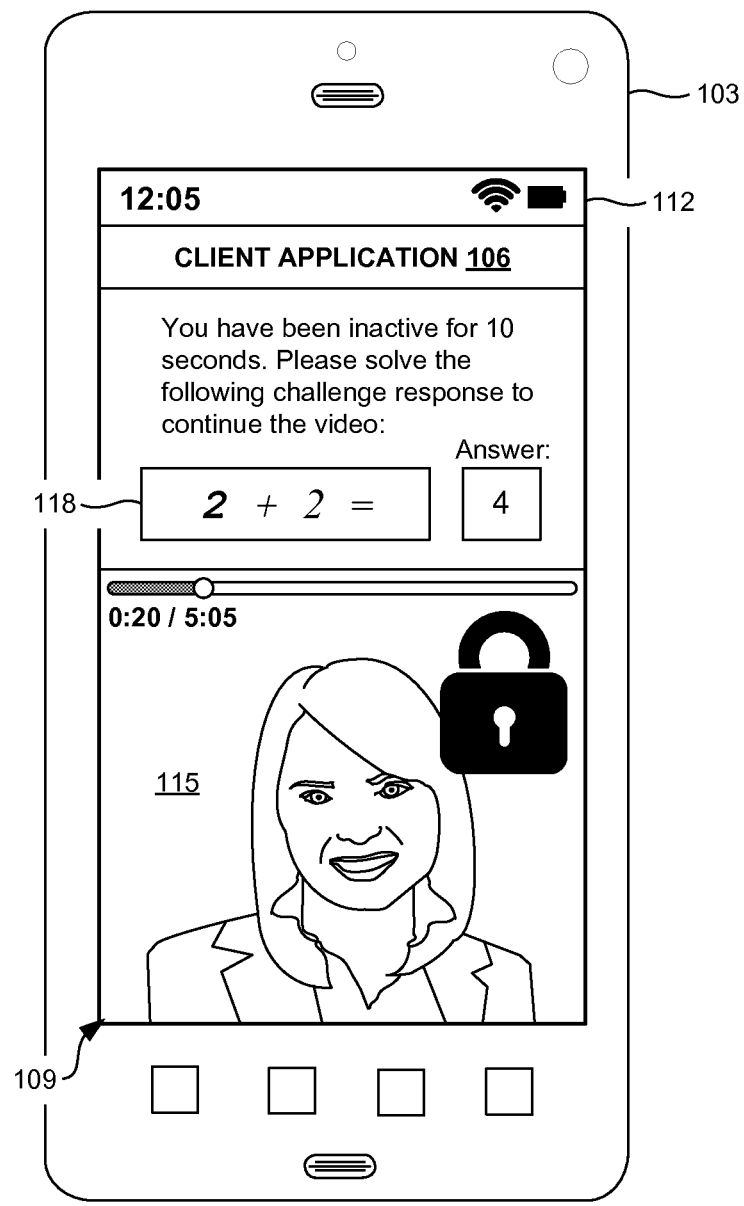
FIG. 1 is a drawing of a user interface for a client application rendered on a client device according to various examples.

As shown in the example scenario of FIG. 1, a client device 103 can include a smartphone, a tablet computing device, a laptop, or any other suitable computing device. A client application 106 executed by the client device 103 renders a user interface 109 on a display 112. In the example scenario of FIG. 1, the client application 106 generates the user interface 109 to present media content 115 to a user. Although shown as video content being rendered in the display 112, other examples of media content 115 can include, for example, an audio file, a combination of an audio and a video file, a word processing document, a spreadsheet, or other suitable content.

An enterprise can permit employees or contractors to use their own devices while working for the enterprise. In other situations, the enterprise can provide the employee or independent contractor with a device. Before being permitted to perform work-related functions, the employee can be required to install and/or execute the client application 106 to enroll the device with a remote management application. The remote management application can provide the user with certain media content 115 and determine whether the user has watched, listened to, or otherwise consumed the media content 115.

As the client application 106 presents media content 115 to the user of the client device 103, the client application 106 can also render various types of file types including, but not limited to, MPEG, AVI, WMV, MP3, WAV, or other similar file types. The client application 106 can verify whether the user is actively looking at or listening to his or her client device 103. To this end, the client application 106 can require the user to perform a predefined action, such as solving a puzzle or a completely automated public Turing test to tell computers and humans apart (CAPTCHA). In the example scenario of FIG. 1, the user can be required to read a CAPTCHA component 118 and duplicate the text set forth in the CAPTCHA. The user can also be required to solve a problem embedded in the CAPTCHA, such as "2+2=4." The client application 106 can periodically poll the user while the media content 115 is being rendered or, in other examples, the client application 106 can detect periods of inactivity. If the client application 106 detects a period of inactivity, the client application 106 can perform a remedial action, such as pausing a playback of the media content 115 and requiring the user to solve a CAPTCHA component 118 before allowing the user to resume the playback of the media content 115.

As a portion of the user interface 109 can be dedicated to various user interface components that determine whether a user is watching or listening to the media content 115, the media content 115 can also be rendered in a suitable position in the user interface 109 to facilitate quick detection of alerts. For example, the CAPTCHA component 118 can be presented in a top portion of the user interface 109 while the media content 115 is rendered in the bottom portion of the user interface 109, or vice versa. In some examples, the media content 115 can consume an entirety of the display 112 while any user interface components used to determine whether a user is watching or listening to the media content 115 can be shown as a dialog on top of the media content 115.

The client application 106 can obtain measurements during a rendering of media content 115 on the client device 103. For example, the client application 106 can obtain any input provided by the user with respect to the CAPTCHA component 118. Similarly, the client application 106 can utilize hardware components of the client device 103 to determine whether the client device 103 is actively being used by a user as opposed to lying flat on a desk. For example, the client application 106 can measure movements of an accelerometer and/or a gyroscope of the client device 103. As a result, the client application 106 can communicate various measurements to a computing environment for analysis. At the direction of the computing environment, or based on predefined constraints stored in memory on the client device 103, remedial actions can be performed by the client application 106 if it is determined that the user is not watching, listening to, or otherwise consuming the media content 115 being rendered by the client device 103.

Figure 2:
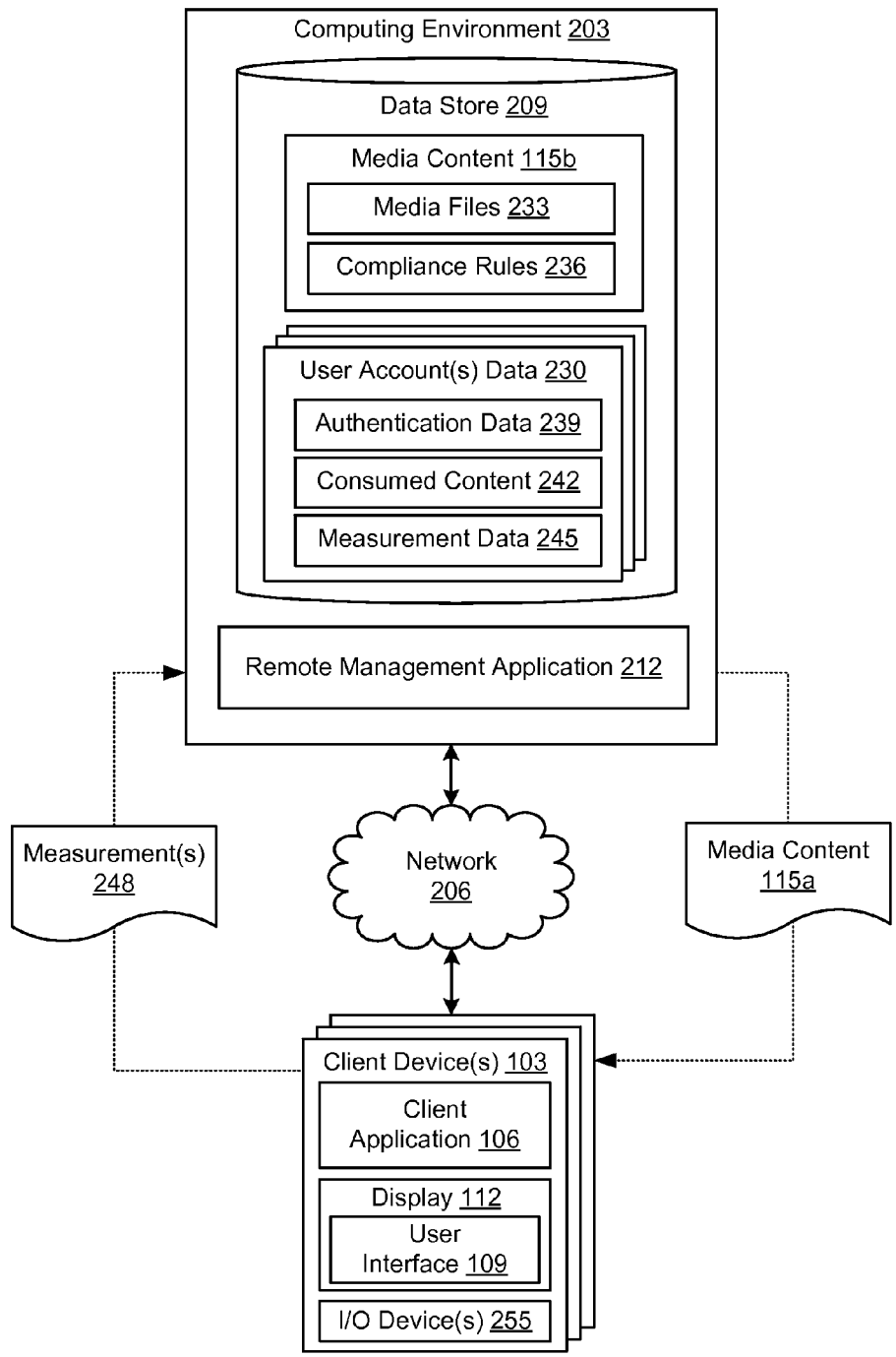
FIG. 2 is a drawing of a networked environment according to various examples.

With reference to FIG. 2, shown is a networked environment 200 according to various examples of the present disclosure. The networked environment 200 includes a computing environment 203 and a client device 103 in communication with one other over a network 206. The network 206 includes, for example, the Internet, one or more intranets, extranets, wide area networks (WANs), local area networks (LANs), wired networks, wireless networks, other suitable networks, or any combination of two or more such networks. For example, the networks can include satellite networks, cable networks, Ethernet networks, telephony networks, and other types of networks.

The computing environment 203 can include, for example, a server computer or any other system providing computing capability. Alternatively, the computing environment 203 can include a plurality of computing devices that are arranged, for example, in one or more server banks, computer banks, or other arrangements. The computing environments 203 can include a grid computing resource and/or any other distributed computing arrangement. The computing devices can be located in a single installation or can be distributed among many different geographical locations. For purposes of convenience, the computing environment 203 is referred to herein in the singular. Even though the computing environment 203 is referred to in the singular, it is understood that a plurality of computing environments 203 can be employed in the various arrangements as described above.

The data store 209 includes memory of the computing environment 203, mass storage resources of the computing environment 203, or any other storage resources on which data can be stored by the computing environment 203. The data store 209 can also be representative of a plurality of data stores 209 as can be appreciated. The components executed by the computing environment 203, for example, include a remote management application 212 and other applications, services, processes, systems, engines, or functionality not discussed in detail herein. Generally, the remote management application 212 can present media content 115a to a user of a client device 103. In addition, the remote management application 212 is configured to determine whether a user is actively watching, listening to, or otherwise consuming media content 115a being rendered by the client device 103. If a determination is made that a user is not actively watching, listening to, or otherwise consuming media content 115a, the remote management application 212 can determine a suitable remedial action. The remedial action can be performed on the client device 103, such as pausing the media content 115a and/or requiring the user to solve a puzzle before allowing the user to proceed with playback or use of the media content 115a.

The data stored in the data store 209 includes, for example, media content 115b, user account data 230, and potentially other data. Media content 115b includes media files 233 that can be transmitted to the client device 103 that are to be consumed by the user. Further, the media content 115b is linked with one or more compliance rules 236 that must be satisfied before a user is allowed to perform functions on the client device 103 beyond watching, listening to, use, or otherwise consuming media files 233. For example, a media file 233 can be linked with one or more compliance rules 236 that can identify conditions that must be satisfied when determining whether a user has satisfactorily consumed the media file 233.

User account data 230 includes data for users of the client devices 103 that can be enrolled with or otherwise serviced by the remote management application 212. The user account data 230 includes, for example, authentication data 239, a listing of consumed content 242, and measurement data 245. The authentication data 239 includes data used to authenticate a user of the client device 103. The authentication data 239 can include a username, a password, an email address, biometric data, or other information that can be used to authenticate a user either during a process of verifying whether the user is actively consumed media content 115a. Authentication data 239 can also be used to authenticate an enrollment of the client device 103 with the remote management application 212.

The listing of consumed content 242 includes one or more of the media files 233 or other media content 115b that has been identified by the remote management application 212 as being satisfactorily consumed by the user. The measurement data 245 includes one or more measurements 248 obtained by the client application 106 and communicated to the computing environment 203. The measurement data 245 can include screen captures of a display 112 of a client device 103; user interactions with the client application 106; sensor data obtained by biometric sensors, accelerometers, gyroscopes, and/or positioning modules; and/or potentially other data.

The client device 103 is representative of one or more client devices 103 capable of enrollment with the remote management application 212. The client device 103 can include, for example, a processor-based system, such as a computer system, that can include a desktop computer, a laptop computer, a personal digital assistant, a cellular telephone, a smartphone, a set-top box, a music player, a tablet computer system, a game console, an electronic book reader, or any other device with like capability. The client device 103 can include a display 112 that includes, for example, one or more devices, such as liquid crystal display (LCD) displays or other types of display devices. The client device 103 can also be equipped with networking capability or networking interfaces, including a localized networking or communication capability, such as an NFC capability, RFID read and/or write capability, a microphone, a speaker, or other localized communication capability.

Further, the client device 103 can include various input/output (I/O) devices 255 beyond the display 112, including, but not limited to, a physical keyboard, a front-facing camera, a rear-facing camera, an accelerometer, a gyroscope, a biometric sensor, a speaker, a microphone, a light emitting diode (LED), a positioning module, such as a global positioning system (GPS) module, and/or other devices. In various examples, the function or performance of one of the I/O devices 255 can be altered by the client application 106 at the direction of the remote management application 212, for example, to perform a remedial action. In addition, the client application 106 can alter the function or performance of networking devices of the client device 103, such as enabling and/or disabling the ability to access certain networks beyond the network 206, such as a corporate intranet, peer-to-peer networks, Bluetooth networks, or the ability receive Internet packets not associated with the remote management application 212.

The client device 103 can execute various applications, such as the client application 106. The client application 106 can access network content served up by the computing environment 203 and/or other servers and render a user interface 109 on the display 112. To this end, the client application 106 can include, for example, a browser or a dedicated application, and the user interface 109 can include a network page or an application screen. The client device 103 can execute applications beyond the client application 106 such as, for example, email applications, media player applications, social networking applications, word processors, spreadsheet applications, and/or other applications. Further, the client application 106 can provide media content 115a to the user and determine whether the media content 115 has been consumed by the user.

Next, a general description of the operation of the various components of the networked environment 200 is provided. To begin, the remote management application 212 communicates media content 115 over the network 206 to the client device 103. In one example, the client application 106 can download the media content 115 upon installation and/or execution of the client application 106. In another example, the media content 115 can be streamed from the remote management application 212. In yet another example, the media content 115 can be preloaded in local memory of the client device 103 before the client device 103 is provided to the user.

The remote management application 212 generates a request for measurement data 245 that specifies measurement data 245 that is to be collected by the client application 106 during rendering of media content 115. Measurement data 245 can be collected during playback of a video or an audio file. In one example, the measurement data 245 can include data associated with a user's interaction with the client application 106, including authentication information provided by the user. The authentication information can include a username, a password, an email address, or a personal identification number (PIN). Similarly, the measurement data 245 can include biometric data collected by a biometric sensor of the client device 103, such as a fingerprint recognition sensor.

In some examples, the measurement data 245 includes a screen capture (also referred to as a "screenshot") of what is being shown on the display 112 of the client device 103. The remote management application 212 can analyze the screen capture to make a determination of whether the user is watching the media content 115 or performing a different activity on the client device 103, such as checking e-mail, playing a game, or browsing the Internet.

In some examples, the measurement data 245 includes a volume level associated with the media content 115 being rendered by the client device 103. To this end, the client application 106 can determine a volume level being used by monitoring an application programming interface (API) associated with the volume level. For the ANDROID® operating system, this can include using the "AudioManager" library. For the IOS® operating system, this can include using the "MPMusicPlayerController" library. In other examples, the client application 106 can cause a microphone of the client device 103 to obtain a recording of the environment. An analysis of the recording can be compared to the media content 115 to determine whether the media content 115 is actually being played through a speaker of the client device 103, as opposed to being muted.

In some examples, the measurement data 245 includes an indication of whether a user manipulated a user interface component in the user interface 109. For example, the client application 106 can generate a dialog or other user interface component to prompt the user with a button to press, a challenge response problem to solve, or another mechanism indicative of whether the user is watching the media content 115. The response provided by the user and/or an amount of time it takes for the user to press the button, solve the challenge response problem, or perform a particular task, can be measured and communicated to the computing environment 203. The measurements can be used to determine whether the user is paying attention to the media content 115. As noted above, the challenge response problem can include a CAPTCHA test, a puzzle, or a game that can be solved by the user. The challenge response problem can be presented periodically or randomly during media content playback.

As the client application 106 is configured to obtain measurement data 245 associated with the client device 103 and/or the user's interactions with the client device 103, the measurement data 245 can be transmitted to the computing environment 203. The remote management application 212 accesses the measurement data 245 received from the client device 103 for analysis.

The remote management application 212 can generate one or more metrics describing a probability that the user has consumed a specified amount of the media content 115. A metric can be determined based on a variety of factors, such as a volume level of the client device 103, an analysis of a screen capture, user input provided by the user, or other factors. The metrics generated by the remote management application 212 can be used to determine whether a compliance rule 236 associated with the media content 115 has been satisfied.

The compliance rule 236 can represent a threshold probability that the user has consumed a specified amount of the media content 115. For example, a generated metric can indicate that there is a 98% probability that the user consumed all of the media content 115 being rendered on the client device 103. If a compliance rule 236 for the particular media file requires a 99% probability, the remote management application 212 determines that the compliance rule is not satisfied. However, if the compliance rule 236 for the particular media file requires a 97% probability, the remote management application 212 determines that the compliance rule 236 is satisfied. Although described as being performed by the remote management application 212, enforcement of the compliance rules 236 may be performed locally on the client device 103 by the client application 106 or by another suitable application.

If the compliance rule 236 is not satisfied, a remedial action can be determined by the remote management application 212. Taking a remedial action can include communicating an additional request from the remote management application 212 to the client device 103 that instructs the client application 106 to perform the remedial action. Remedial actions can include, for example, pausing a playback of the media content 115, rewinding the media content 115 to a point in time where a determination was made that the user was consuming the media content 115, disabling a function of the client device 103, or generating a user interface component that requires interaction by the user. The remedial action can also include starting a video over from the beginning. In one example, the remedial action can be specified in the compliance rule 236.

If the remote management application 212 determines that the compliance rule 236 has been satisfied, the media content 115 can continue to be rendered on the client device 103 while the client application 106 continues to communicate measurement data 245 to the computing environment 203. As a result, the remote management application 212 can continue to verify compliance of the compliance rule 236 based on the measurement data 245 until the media content 115 has been consumed. Although the remote management application 212 is described as verifying compliance during rendering or playback of the media content 115, compliance can be determined after completion of the media content 115 using the measurement data 245 generated by the client application 106 during playback.

Figure 3A:
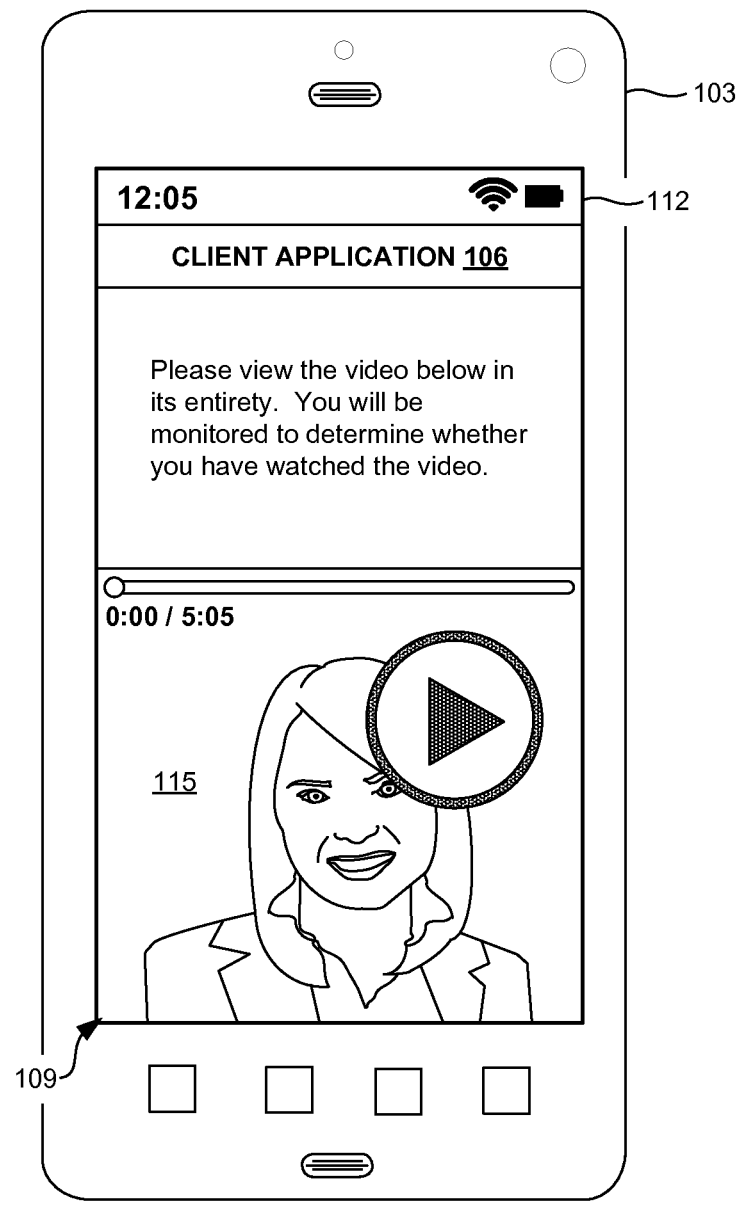
FIGS. 3A-3C are drawings of user interfaces for a client application rendered on a client device according to various examples.

Referring next to FIG. 3A, a scenario is shown where the client application 106 presents media content 115 to the user. In one example, the media content 115 can include a video file having an audio and a video component. In another example, the media content 115 can be a file, such as a document, a spreadsheet, a presentation document, or other suitable file. Settings of the remote management application 212 can specify that the media content 115 should be viewed in its entirety. To this end, the client application 106 can disable skipping through the media content 115. However, the client application 106 can permit skipping by requiring the user to later watch the skipped portions of the media content 115.

Figure 3B:
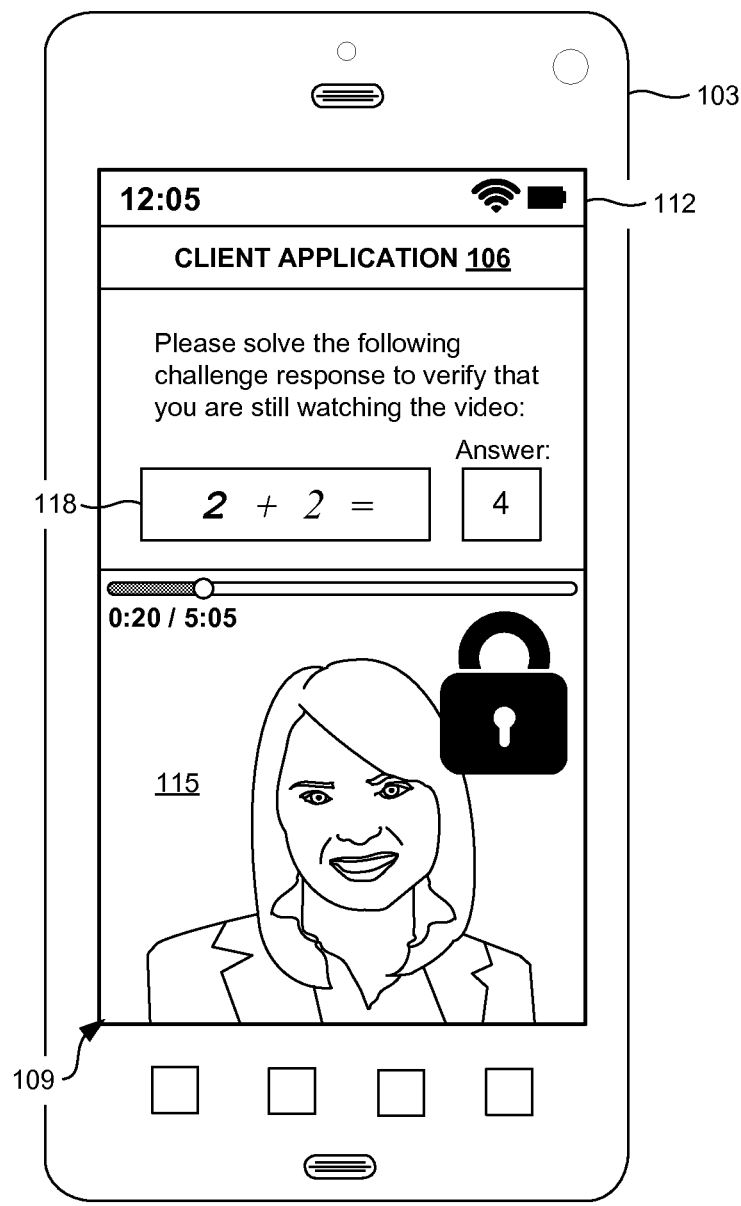

Moving on to FIG. 3B, the client application 106 executable in the client device 103 is shown rendering a user interface 109 in a display 112 of the client device 103. In the example scenario of FIG. 3B, the client application 106 verifies whether the user is looking at or listening to his or her client device 103. To this end, the client application 106 can require the user to perform a predefined action, such as solving a puzzle or a CAPTCHA if it is determined that the user is not actively consuming the media content 115 and/or if the user has remained inactive for a predefined amount of time. In the example scenario of FIG. 3B, the user is required to read a CAPTCHA component 118 and duplicate the text set forth in the CAPTCHA or solve a problem presented by the CAPTCHA, such as "2+2=4."

Further, the client application 106 obtains measurements 248 during playback of media content 115. For example, the client application 106 can obtain any input provided by the user in association with the CAPTCHA component 118 or any other user interface component. Similarly, the client application 106 can utilize hardware components of the client device 103 to determine whether the client device 103 is actively being used by a user at an angle as opposed to lying flat on a desk. For example, the client application 106 can measure movements detected by an accelerometer and/or a gyroscope of the client device 103. The client application 106 can also monitor an eye gaze with a camera built into the client device 103 to determine whether a user views the content. As a result, the client application 106 can communicate various measurements 248 to the computing environment 203 for analysis. At the direction of the remote management application 212 or based on predefined constraints stored in memory on the client device 103, the client application 106 can perform remedial actions if it determines that the user is not watching, listening to, or otherwise consuming the media content 115. This can include presenting the CAPTCHA component 118 or any other suitable user interface component.

Figure 3C:
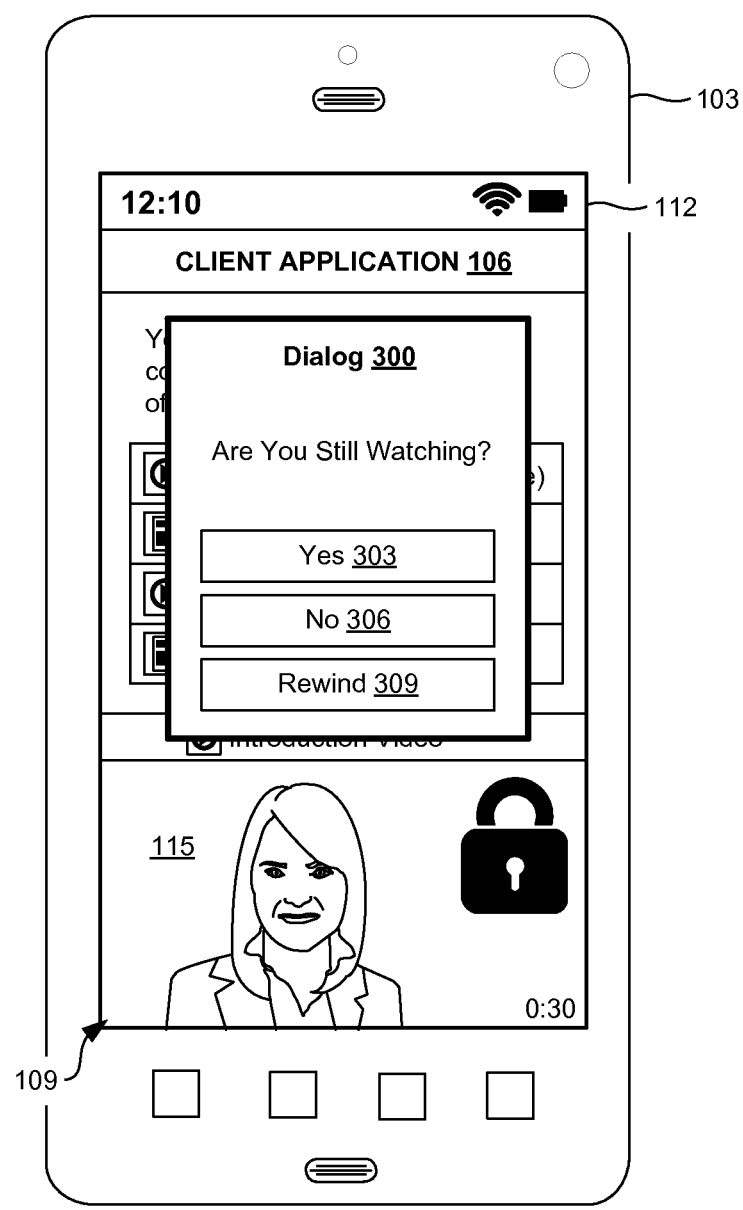

Moving on to FIG. 3C, the client application 106 is shown rendering a user interface 109 in a display 112 of the client device 103. In the example scenario of FIG. 3C, the user interface 109 presents the user with a dialog 300 that periodically polls the user while the media content 115 is being rendered. The client application 106 can present the dialog 300 after periods of inactivity, such as periods when the client device 103 has not moved as detected by the accelerometer and/or the gyroscope. If the client application 106 detects a period of inactivity, the client application 106 can perform a remedial action, such as pausing playback of the media content 115. The client application 106 can also require the user to indicate whether the user is still watching through the yes component 303 or the no component 306. In one example, the dialog 300 can present a rewind component 309 that allows the user to rewind a playback of the media content 115.

Figure 4A:
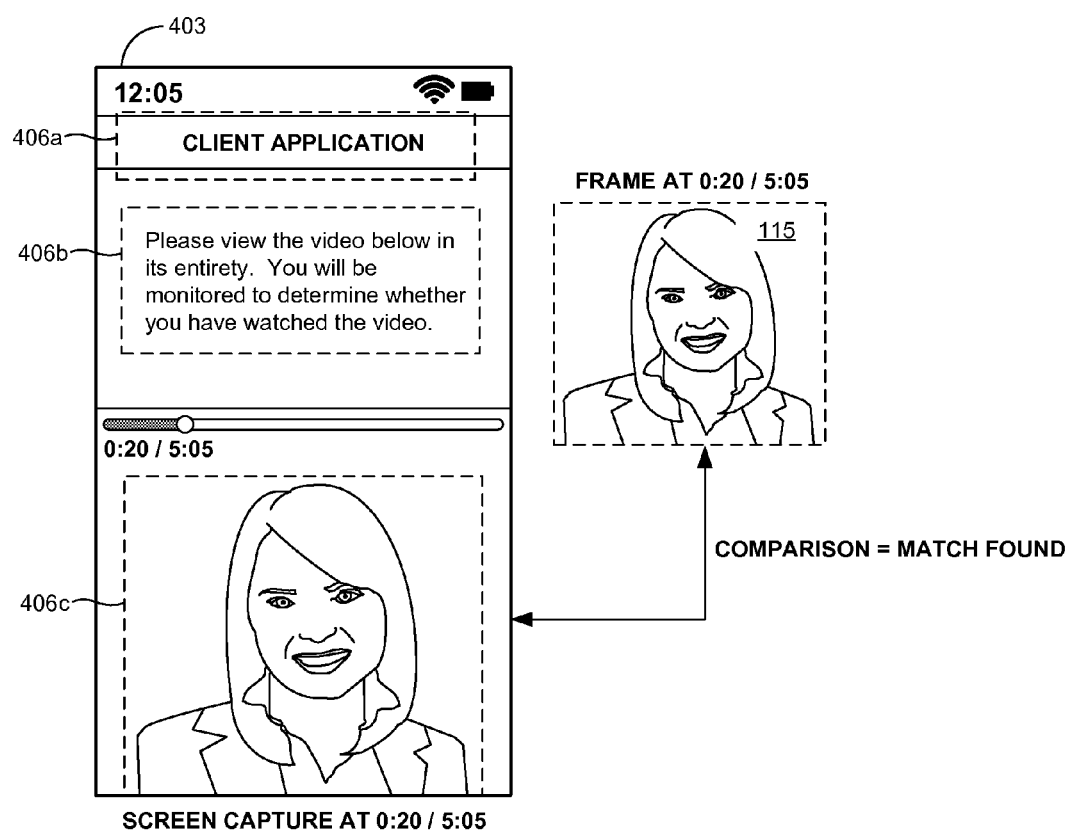
FIG. 4A-4B are drawings of a comparison of a screen capture compared to a frame of media content according to various examples.

Moving on to FIG. 4A, shown is a screen capture 403 generated by the client application 106), for example, while the media content 115 is being rendered by the client device 103. The screen capture 403 can be communicated to the computing environment 203 for analysis by the remote management application 212 or other suitable application. The remote management application 212 can identify regions 406a . . . 406c (collectively regions 406) in the screen capture 403 for comparison to a frame of the media content 115 accessed from the data store 209.

The screen capture 403 can be associated with a playback time of the media content 115 when it was generated by the client application 106. For example, if the screen capture 403 was generated 20 seconds into the playback of the media content 115, the screen capture 403 can be compared to the frame of the media content 115 located at 20 seconds. If the comparison results in a match, the remote management application 212 can determine that the user was watching the media content 115 at the 20 second mark in the media content 115. The results of the comparison can be used in generating a metric indicating a probability that the user is watching or otherwise consuming the media content 115.

Figure 4B:
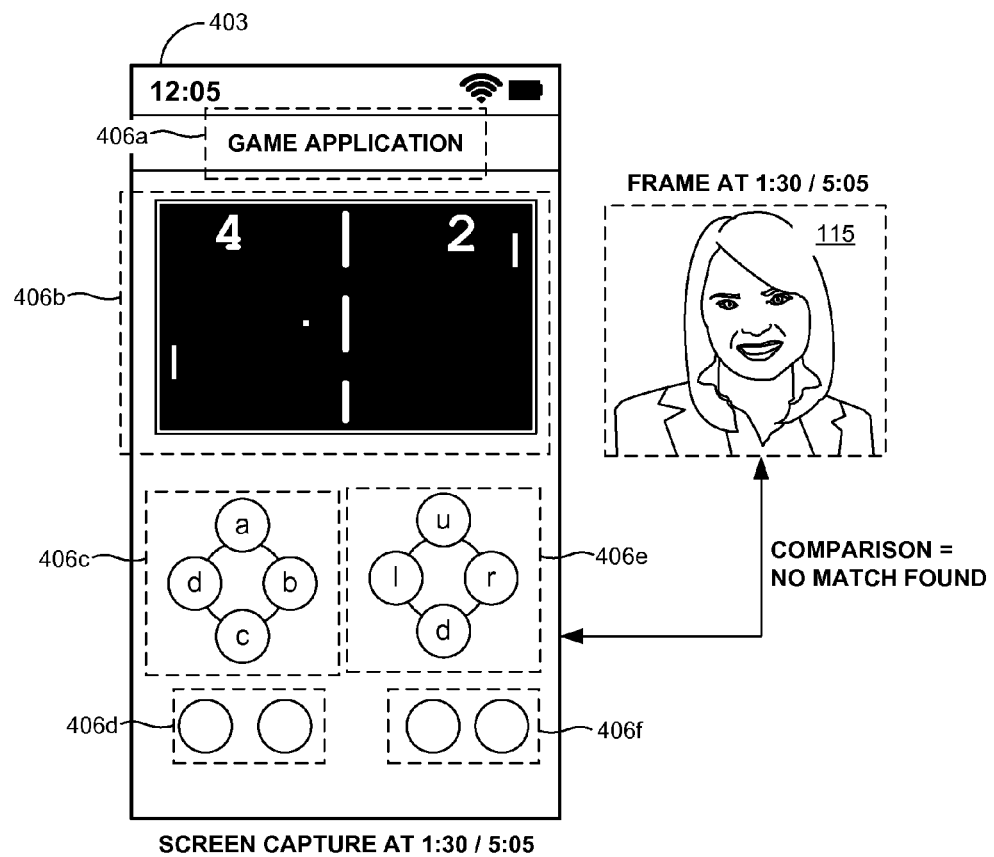

Turning now to FIG. 4B, shown is another screen capture 403 generated by the client application 106, for example, while the media content 115 is being rendered in the display 112 of the client device 103. The remote management application 212 identifies regions 406a . . . 406f (collectively regions 406) in the screen capture 403 for comparison to a frame of the media content 115 accessed from the data store 209.

The screen capture 403 is associated with a playback time of the media content 115 when it was generated by the client application 106. Therefore, the screen capture 403 can be compared to a frame at an identical time of the playback or frames within a threshold. For example, if the screen capture 403 was generated one minute and thirty seconds into the playback of the media content 115, the screen capture 403 can be compared to the frame of the media content 115 at one minute and thirty seconds or to frames around one minute and thirty seconds. If the comparison results in a match, the remote management application 212 can determine that the user was watching the media content 115 at the 20 second mark in the media content 115. However, as shown in FIG. 4B, the screen capture 403 shows that the client device 103 is executing a game application instead of rendering the media content 115. As a result, the comparison can be used in generating a metric indicating a low probability that the user is watching or otherwise consuming the media content 115 at the given time.

Figure 5:
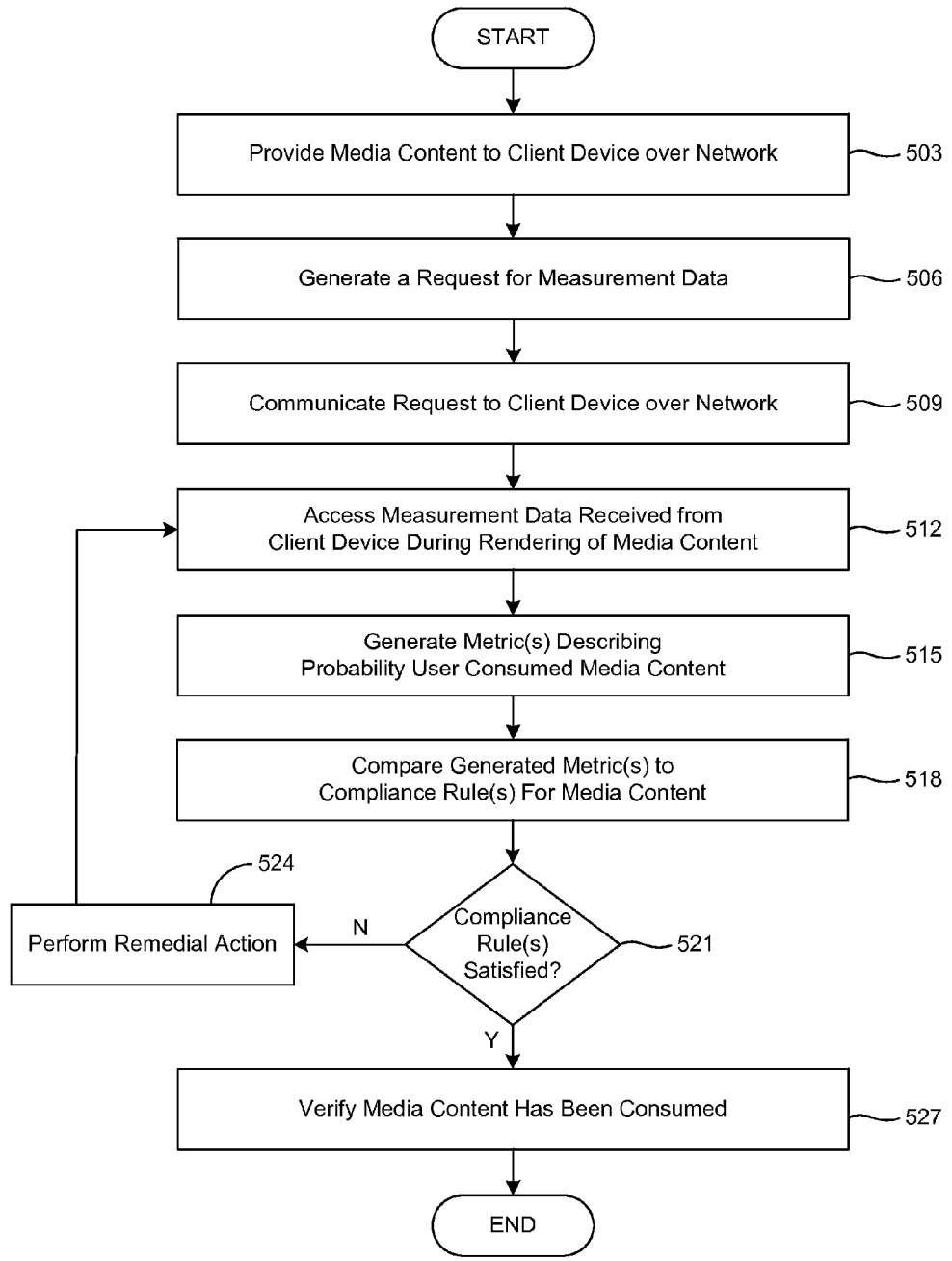
FIG. 5 is a flowchart illustrating an example of functionality implemented by components executed in the networked environment of FIG. 2 according to various examples.

Referring next to FIG. 5, shown is a flowchart that provides one example of the operation of a portion of the remote management application 212. Functionality attributed to the remote management application 212 can also be implemented in a single process or application executed by the client device 103 and/or multiple processes or applications. The separation or segmentation of functionality as discussed herein is presented for illustrative purposes.

The remote management application 212 can present media content 115 to a user of a client device 103 and determine whether a user is watching, listening to, or otherwise consuming media content 115 being rendered by the client device 103.

Starting with step 503, the remote management application 212 transmits media content 115 over the network 206 to the client device 103. In one example, the media content 115 to be viewed by the user of the client device 103 can be downloaded by the client application 106 upon installation and/or execution of the client application 106. In another example, the content to be consumed by the user of the client device 103 can be streamed by the client application 106 from the remote management application 212 such that a complete download of the media content 115 is not required. Although shown in FIG. 5 as being communicated over the network 206 to the client device 103, the media content 115 can also be preloaded in local memory of the client device 103 before the client device 103 is provided to the user.

Next, in step 506, the remote management application 212 generates a request for measurement data 245. The request can specify particular measurement data 245 that is to be collected on the client device 103 by the client application 106 during playback of the media content 115. For example, the request can configure the client application 106 to measure and record particular data associated with the client device 103. For example, the measurement data 245 can include data associated with a user's interaction with the client application 106, such as authentication information provided by the user, such as a username, a password, an email address, or a personal identification number (PIN). Similarly, the measurement data 245 can include biometric data collected by a biometric sensor of the client device 103, such as a fingerprint recognition sensor. The biometric data 245 can be collected throughout playback of the video. For example, a user can be prompted to provide a fingerprint every period of time (e.g., every sixty seconds) or at random intervals. In another example, the biometric data can include a camera still image used to detect a user's eye gaze, or a result of an eye gaze determination conducted locally by the client device 103. The determination of a user's eye gaze can also occur in response to triggering events. For example, if the system detects that the client device has been laid down flat, the camera can check a user's eye gaze to determine if the user is still viewing the content.

The measurement data 245 can include a screen capture (also referred to as a "screenshot") of what is being shown in the display 112 of the client device 103. As described above with respect to FIGS. 4A-4B, the remote management application 212 can analyze the screen capture to determine whether the user is watching the media content 115 or performing a different activity on the client device 103, such as checking e-mail, playing a game, or browsing the Internet.

The measurement data 245 can further include a volume level associated with the media content 115 being rendered by the client device 103. To this end, the client application 106 can determine a volume level being used by monitoring an application programming interface (API) associated with the volume level. For the ANDROID® operating system, this can include using the "AudioManager" library. For the IOS® operating system, this can include using the "MPMusicPlayerController" library. Further, the client application 106 can cause a microphone of the client device 103 to obtain a recording of the environment. An analysis of the recording can be compared to the media content 115 to determine whether the media content 115 is actually being played on a speaker of the client device 103 (and heard by the user of the client device 103) as opposed to being muted.

The measurement data 245 can include an indication of whether a user manipulated a user interface component in the user interface 109. For example, the client application 106 can generate a dialog or other user interface component to prompt the user with a button to press, a challenge response problem to solve, or another suitable mechanism indicative of whether the user is watching the media content 115. The dialog or user interface component can be presented at fixed intervals or randomly during playback. The response provided by the user and/or an amount of time it takes for the user to interact with the user interface component can be measured and communicated to the computing environment 203. As noted above, the challenge response problem can include a CAPTCHA test, a puzzle, or a game.

In step 509, the remote management application 212 can transmit the request to the client device 103. When received by the client device 103, the client application 106 accesses the request and configures the client application 106 to collect the measurement data 245 specified in the request.

As the client application 106 is configured to obtain measurement data 245 associated with the client device 103, the measurement data 245 can be communicated to the computing environment 203 over the network 206. Consequently, in step 512, the remote management application 212 can access the measurement data 245 received from the client device 103 for analysis.

In step 515, the remote management application 212 can generate one or more metrics using the measurement data 245, where the metrics describe a probability of whether the user has consumed a required amount of the media content 115. The remote management application 212 can determine a first metric can describing a probability that the user has watched a required amount of the media content 115. Additionally, the remote management application 212 can determine a second metric describing a probability that the user has listened to all or a required amount of the media content 115.

For example, assuming the volume level for the client device 103 was muted, the remote management application 212 can determine a metric, such as 0 or 0%, indicating that there was a 0% chance the user actually listened to the media content 115 while it was being rendered on the client device 103. Conversely, assuming the volume level for the client device 103 was set to a reasonable level and assuming the user provided feedback when prompted to do so, the remote management application 212 can determine a metric, such as 98 or 98%, indicating that there was a 98% chance that the user actually consumed the media content 115 while it was being rendered on the client device 103.

A metric can be generated based on a variety of factors, such as a volume level, an analysis of screen capture, user input, or other factors, wherein each of the factors is assigned a predefined weight by an administrator of the remote management application 212 or other suitable personnel. The metric can be calculated as a function of factors and weights expressed as:

$$M = w_1 f_1 + w_2 f_2 + \ldots + w_n f_n \quad \text{(eq. 1)},$$

where M is the metric, $f_n$ is a value for a given factor, and $w_n$ is a predefined weight assigned the factor. In one example, a higher weight can be assigned to a factor being more indicative of whether the user is consuming the media content 115. A lower weight can be assigned to a factor being less indicative of whether the user is consuming the media content 115. For example, the volume level of the client device 103 can be highly indicative of whether the user is listening to media content 115 being rendered, while a screen shot can be less indicative of whether the user is listening to the media content 115. The opposite can be true if the metric is being determined for whether the user is viewing the media content 115. For example, the screen capture of what is being shown in the display 112 of the client device 103 can be highly indicative of whether the user is watching the media content 115 being rendered, while a volume level can be less indicative of whether the user is watching to the media content 115.

A metric that can describe a probability that a user is both watching and listening to media content 115 can be determined by a combination of a first metric describing a probability a user is watching media content 115 and a second metric describing a probability a user is listening to the media content 115. The function can be expressed as:

$$M_{Consuming} = (M_{Watching} + M_{Listening})/2 \quad \text{(eq. 2)},$$

where $M_{Consuming}$ is the metric describing a probability a user is both watching and listening to media content 115, $M_{Watching}$ is the metric describing a probability a user is watching media content 115, and $M_{Listening}$ is the metric describing a probability a user is listening to the media content 115. Eq. 2 can be beneficial in scenarios where the media content 115 includes both an audio component and a video component.

Next, in step 518, the one or more metrics generated for the user can be used to determine whether a compliance rule 236 associated with the media content 115 has been satisfied. The compliance rule 236 can specify a predefined probability that must be met before the remote management application 212 determines that a user has consumed the requisite amount of media content 115. For example, a generated metric can indicate that there is a 98% probability that the user consumed all of the media content 115 being rendered on the client device 103. If a compliance rule 236 for the particular media file requires a 99% probability, the remote management application 212 determines that the compliance rule is not satisfied based on the generated metric. However, if the compliance rule 236 for the particular media file requires a 97% probability, a determination is made that the compliance rule 236 is satisfied.

Accordingly, in step 521, it is determined whether the compliance rule 236 is satisfied. If the compliance rule 236 is not satisfied, the process proceeds to step 524 where a remedial action can be identified by the remote management application 212 and transmitted to the client device 103. The remedial actions can include, for example, pausing a playback of the media content 115, rewinding the media content 115 to a previously consumed portion of the media content 115, disabling a function of the client device 103, or generating a user interface component requiring a manipulation to be performed by the user. The remedial action can be specified in the compliance rule 236. After the remedial action is communicated to the client device 103, the process reverts back to step 512 to continue accessing measurement data 245 received from the client device 103 until the media content 115 has been fully rendered.

Referring again to step 521, if the remote management application 212 determines that the compliance rule 236 has been satisfied, the process proceeds to step 527. In step 527, the remote management application 212 verifies that the media content 115 has been consumed by the user of the client device 103. Verification can include adding the media content 115, or an identifier for the media content 115, to the list of consumed content 242 stored in the data store 209. Thereafter, the process proceeds to completion.

Figure 6:
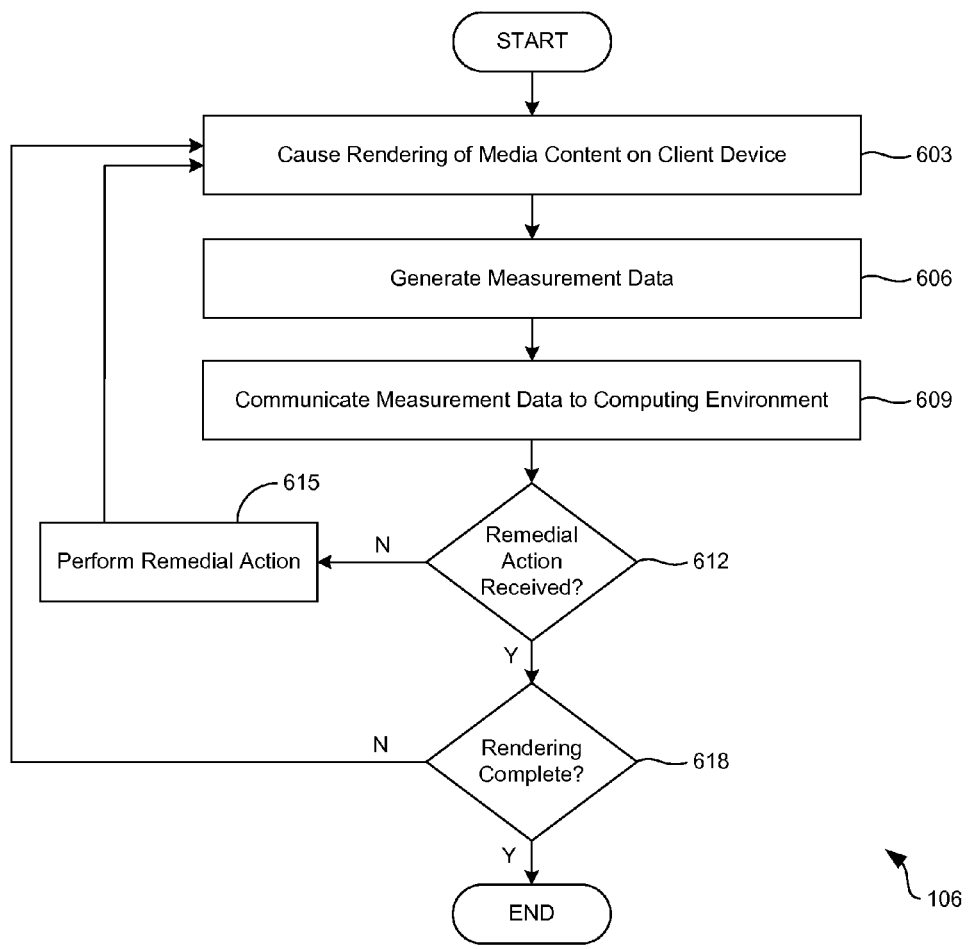
FIG. 6 is another flowchart illustrating an example of functionality implemented by components executed in the networked environment of FIG. 2 according to various examples.

Referring next to FIG. 6, shown is a flowchart that provides one example of the operation of a portion of the client application 106. Functionality attributed to the client application 106 can be implemented in a single process or application executed by the client device 103 and/or multiple processes or applications. The separation or segmentation of functionality as discussed herein is presented for illustrative purposes only.

In step 603, the client application 106 renders media content 115 on the client device 103. To this end, the client application 106 can cause an audio component of the media content 115 to be played through a speaker of the client device 103 and/or cause the video component of the media content 115 to be shown on a display 112.

As the remote management application 212 is configured to determine whether a user is consuming media content 115 being rendered by the client device 103, in step 606, the client application 106 generates measurement data 245 to be communicated to the computing environment 203 for analysis. The client application 106 can access a request received from the computing environment 203 that identifies specific measurement data 245 to be collected during playback of the media content 115. For example, the request can require the client application 106 to measure and record certain data in association with the client device 103. In step 609, the client application 106 transmits the measurement data 245 to the computing environment 203.

The remote management application 212 determines whether remedial actions need to be performed on the client device 103, such as when it is determined that a compliance rule 236 is not satisfied. Accordingly, in step 612, the client application 106 determines whether a remedial action has been received in an additional request from the remote management application 212. The client application 106 can perform the remedial action determined by the remote management application 212 and identified in the additional request. If a remedial action is received, the process proceeds to step 615 to perform the remedial action. Subsequently, the process can revert to step 603 to continue playback of the media content 115 on the client device 103.

If a remedial action is not received, such as when the compliance rule 236 is being satisfied, the process can proceed to step 618 where the client application 106 determines whether playback of the media content 115 on the client device 103 has been completed. If playback of the media content 115 has not been completed, such as when additional playback of the media content 115 is required, the process reverts to step 603 to continue playback of the media content 115 on the client device 103. If playback has been completed, the process proceeds to completion. Although the process of evaluating measurement data has been described with reference to computing environment 203, the steps described herein can also be performed locally by client device 103.

The client devices 103 or devices including a computing environment 203 can include at least one processor circuit, for example, having a processor and at least one memory device, both of which are coupled to a local interface, respectively. The device can include, for example, at least one computer, a mobile device, smartphone, computing device or like device. The local interface can include, for example, a data bus with an accompanying address/control bus or other bus structure.

Stored in the memory device are both data and several components that are executable by the processor. In particular, stored in the one or more memory devices and executable by the processor of such a device can be the client application 106, the remote management application 212, and potentially other applications. Also stored in the memory can be a data store 209 and other data.

A number of software components are stored in the memory and are executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors, between any processor and any of the memory devices. The local interface can include additional systems designed to coordinate this communication, including, for example, performing load balancing. The processor can be of electrical or of some other available construction.

The client devices 103 can include a display 112 upon which a user interface 109 generated by the client application 106 or another application can be rendered. The client device 103 can also include one or more input/output devices that can include, for example, a capacitive touchscreen or other type of touch input device, fingerprint reader, or keyboard.

Although the remote management application 212, the client application 106, and other various systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show an example of the functionality and operation of an implementation of portions of components described herein. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, one or more of the blocks shown in the drawings can be skipped or omitted. In addition, any number of counters, state variables, warning semaphores, or messages might be added to the logical flow described herein, for purposes of enhanced utility, accounting, performance measurement, or providing troubleshooting aids. It is understood that all such variations are within the scope of the present disclosure.

Also, any logic or application described herein that includes software or code can be embodied in any non-transitory computer-readable medium for use by or in connection with an instruction execution system such as, for example, a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described examples without departing substantially from the spirit and principles of the disclosure. All such modifications and variations are intended to be included herein within the scope of this disclosure.

Therefore, the following is claimed:

1. A non-transitory computer-readable medium embodying program instructions executable in at least one computing device comprising at least one hardware processor that, when executed by the at least one computing device, cause the at least one computing device to:
   generate a request for measurement data obtained by a client device during playback of media content;
   generate a metric based upon the measurement data received from the client device, the metric indicating a probability that a user of the client device has watched at least a portion of the media content;
   identify a compliance rule associated with the media content, the compliance rule specifying a threshold amount of the media content required to be consumed for the client device to maintain compliance with a remote management service;
   determine that the compliance rule associated with the media content has not been satisfied based at least in part upon the metric; and
   generate an additional request for transmission to the client device in response to the compliance rule not being satisfied, the additional request causing a client application executable in the client device to perform a remedial action identified by the additional request.

2. The non-transitory computer-readable medium of claim 1, wherein the measurement data comprises at least one of a username, a password, a personal identification number (PIN), a screen capture of an application executing on the client device, or biometric information obtained from a biometric sensor of the client device.

3. The non-transitory computer-readable medium of claim 1, wherein the measurement data is generated based on monitoring a volume level during playback of the media content, the volume level being monitored using at least one of an application programming interface (API) associated with the volume level or an analysis of a recording obtained from a microphone of the client device.

4. The non-transitory computer-readable medium of claim 1, wherein the measurement data indicates that a user interface component in a user interface rendered by the client device was manipulated and an amount of time associated with a manipulation of the user interface component.

5. The non-transitory computer-readable medium of claim 4, wherein the user interface component further comprises a challenge response problem, and the manipulation of the user interface component comprises an attempt to solve the challenge response problem obtained from the user.

6. The non-transitory computer-readable medium of claim 5, wherein the challenge response problem further comprises at least one of a completely automated public Turing test to tell computers and humans apart (CAPTCHA), a puzzle, or a game.

7. The non-transitory computer-readable medium of claim 1, wherein the remedial action further comprises at least one of pausing playback of the media content, rewinding the media content a previously consumed portion of the media content, disabling a function of the client device, or generating a user interface component that requires an action to be performed by the user.

8. A method, comprising:
   generating a request for measurement data from a client device during rendering of media content;
   generating a metric based at least upon the measurement data indicating a probability a user of the client device has watched at least a portion of the media content;
   identifying a compliance rule associated with the media content, the compliance rule specifying a threshold amount of the media content required to be consumed for the client device to maintain compliance with a remote management service;
   determining that the compliance rule associated with the media content has not been satisfied based at least in part upon the metric; and
   generating, by the at least one computing device, an additional request for the client device in response to the compliance rule not being satisfied, the additional request causing the client device to perform a remedial action specified by the additional request.

9. The method of claim 8, wherein the measurement data comprises at least one of a username, a password, a personal identification number (PIN), a screen capture of an application executing on the client device, or biometric information obtained from a biometric sensor of the client device.

10. The method of claim 8, wherein the measurement data is generated based on monitoring a volume level associated with the media content, the volume level being determined using at least one of an application programming interface (API) associated with the volume level or an analysis of a recording obtained from a microphone of the client device.

11. The method of claim 8, wherein the measurement data indicates that a user interface component in a user interface was manipulated and an amount of time associated with a manipulation of the user interface component.

12. The method of claim 11, wherein the user interface component further comprises a challenge response problem, and the manipulation of the user interface component comprises an attempt to solve the challenge response problem.

13. The method of claim 12, wherein the challenge response problem further comprises at least one of a completely automated public Turing test to tell computers and humans apart (CAPTCHA), a puzzle, or a game.

14. The method of claim 8, wherein the remedial action further comprises at least one of pausing a playback of the media content, rewinding the media content to a previously consumed portion of the media content, disabling a function of the client device, or generating a user interface that requires a manipulation to be performed by the user.

15. A system, comprising:
at least one computing device in data communication with a client device over a network; and
a remote management application that, when executed by the at least one computing device, causes the at least one computing device to at least:
generate a request for measurement data from the client device during playback of media content;
generate a metric based at least upon the measurement data indicating a probability a user of the client device has watched at least a portion of the media content;
identifying a compliance rule associated with the media content, the compliance rule specifying a threshold amount of the media content required to be consumed for the client device to maintain compliance with the remote management application;
determine that a compliance rule associated with the media content is not satisfied based at least in part upon the metric; and
generate an additional request for the client device in response to the compliance rule not being satisfied, the additional request causing a client application executable in the client device to perform a remedial action identified by the additional request.

16. The system of claim 15, wherein the measurement data comprises at least one of a username, a password, a personal identification number (PIN), a screen capture of an application executing on the client device, or biometric information obtained from a biometric sensor of the client device.

17. The system of claim 15, wherein the measurement data is obtained based on monitoring a volume level associated with the media content during playback, the volume level being determined using at least one of an application programming interface (API) associated with the volume level or an analysis of a recording obtained from a microphone of the client device.

18. The system of claim 15, wherein the measurement data indicates that a user interface component in a user interface as manipulated and an amount of time associated with a manipulation of the user interface component, the user interface component further comprising a challenge response problem and the manipulation of the user interface component comprising an attempt to solve the challenge response problem.

19. The system of claim 18, wherein the challenge response problem further comprises at least one of a completely automated public Turing test to tell computers and humans apart (CAPTCHA), a puzzle, or a game.

20. The system of claim 15, wherein the remedial action further comprises at least one of pausing playback of the media content, rewinding the media content to a previously consumed portion of the media content, disabling a function of the client device, or generating a user interface component that requires a manipulation to be performed by the user.

* * * * *